(12) United States Patent
Nishiyama et al.

(10) Patent No.: US 11,325,496 B2
(45) Date of Patent: May 10, 2022

(54) ELECTRIC POWER SUPPLY SYSTEM FOR VEHICLE

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/061,131

(22) Filed: Oct. 1, 2020

(65) Prior Publication Data

US 2021/0213852 A1 Jul. 15, 2021

(30) Foreign Application Priority Data

Jan. 15, 2020 (JP) .............................. JP2020-004164

(51) Int. Cl.
*B60L 58/12* (2019.01)
*H02J 7/00* (2006.01)

(52) U.S. Cl.
CPC ............ *B60L 58/12* (2019.02); *H02J 7/0048* (2020.01); *B60L 2240/547* (2013.01)

(58) Field of Classification Search
CPC .... B60L 58/12; B60L 2240/547; H02J 7/0048
See application file for complete search history.

(56) References Cited

U.S. PATENT DOCUMENTS

| | | | |
|---|---|---|---|
| 2009/0030568 A1* | 1/2009 | Amano | F02D 41/021 701/22 |
| 2014/0343831 A1* | 11/2014 | Hosey | H02J 7/0032 701/113 |
| 2016/0089992 A1* | 3/2016 | Le | H02J 7/00047 320/107 |
| 2018/0118037 A1* | 5/2018 | Ueo | B60W 50/04 |

FOREIGN PATENT DOCUMENTS

JP 2019164716 A 9/2019

* cited by examiner

*Primary Examiner* — Jared Fureman
*Assistant Examiner* — Duc M Pham
(74) *Attorney, Agent, or Firm* — Dinsmore & Shohl LLP

(57) ABSTRACT

A control device distributes electric power from a battery to an electric power feed terminal when the remaining level of a battery is equal to or higher than a predetermined value with an ignition off. Therefore, an electronic component can be charged after being connected to the electric power feed terminal, even with the ignition off. When the remaining level of the battery is lower than the predetermined value, the distribution of electric power from the battery to the electric power feed terminal is shut off, so the electric component can be stopped from being charged, even after being connected to the electric power feed terminal. In consequence, even when the electronic component can be charged after being connected to the electric power feed terminal with the ignition off, a battery remaining level that is needed when a vehicle runs next time can be ensured.

12 Claims, 5 Drawing Sheets

ELECTRIC POWER SUPPLY SYSTEM FOR VEHICLE

CROSS-REFERENCE TO RELATED APPLICATION

This application claims priority to Japanese Patent Application No. 2020-004164 filed on Jan. 15, 2020, incorporated herein by reference in its entirety.

BACKGROUND

1. Technical Field

The disclosure relates to an electric power supply system for a vehicle at the time when an ignition is off.

2. Description of Related Art

Japanese Unexamined Patent Application Publication No. 2019-164716 (JP 2019-164716 A) discloses an art of connecting an electronic component such as a personal computer or a smartphone to an electric power feed terminal (a USB terminal) provided in a cabin and charging the electronic component.

However, the art disclosed in the aforementioned publication has the following problem. In an attempt to continuously charge the electronic component when an ignition is off as well as when the ignition is on, the remaining level of a battery becomes low. Therefore, when the ignition is turned on again to cause a vehicle to run, it may become impossible to ensure a battery remaining level that is needed for the vehicle to reach a destination (a battery remaining level that is needed when the vehicle runs next time).

SUMMARY

It is an object of the disclosure to provide an electric power supply system for a vehicle that can ensure a battery remaining level that is needed when the vehicle runs next time, even in the case where an electronic component is charged with an ignition off.

The disclosure, which achieves the aforementioned object, is as follows. (1) An electric power supply system for a vehicle is designed to supply electric power to an electronic component that is connected to an electric power feed terminal in a cabin. The electric power supply system has an electric power feed terminal, a battery as an electric power supply source, and a control device that controls distribution of electric power from the battery to the electric power feed terminal. The control device distributes electric power from the battery to the electric power feed terminal, when a remaining level of the battery is equal to or higher than a predetermined value with an ignition off. (2) In the electric power supply system for the vehicle described in (1), the predetermined value may be determined based on a next scheduled running distance. (3) In the electric power supply system for the vehicle described in (2), the next scheduled running distance may be determined through prediction by a cloud. (4) In the electric power supply system for the vehicle described in (2), the next scheduled running distance may be determined through the setting of navigation by a user.

With the electric power supply system for the vehicle described above in (1), the control device distributes electric power from the battery to the electric power feed terminal when the remaining level of the battery is equal to or higher than the predetermined value with the ignition off. Therefore, when the remaining level of the battery is equal to or higher than the predetermined value, the electronic component can be charged after being connected to the electric power feed terminal even with the ignition off. On the other hand, when the remaining level of the battery is lower than the predetermined value, the distribution of electric power from the battery to the electric power feed terminal is shut off, so the electronic component can be stopped from being charged even after being connected to the electric power feed terminal. In consequence, even in the case where the electronic component can be charged after being connected to the electric power feed terminal with the ignition off, the battery remaining level that is needed when the vehicle runs next time can be ensured.

With the electric power supply system for the vehicle described above in (2), the predetermined value is determined based on the next scheduled running distance. Therefore, the battery remaining level that is needed when the vehicle runs next time can be reliably ensured.

With the electric power supply system for the vehicle described above in (3), the next scheduled running distance is determined through prediction by the cloud. Therefore, the next scheduled running distance is determined based on information on a destination and a route that are predicted by the cloud.

With the electric power supply system for the vehicle described above in (4), the next scheduled running distance is determined through the setting of navigation by the user. Therefore, the next scheduled running distance can be determined based on information on a destination and a route that are set by the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is also applicable to the second embodiment of the disclosure;

DETAILED DESCRIPTION OF EMBODIMENTS

Figure 1:
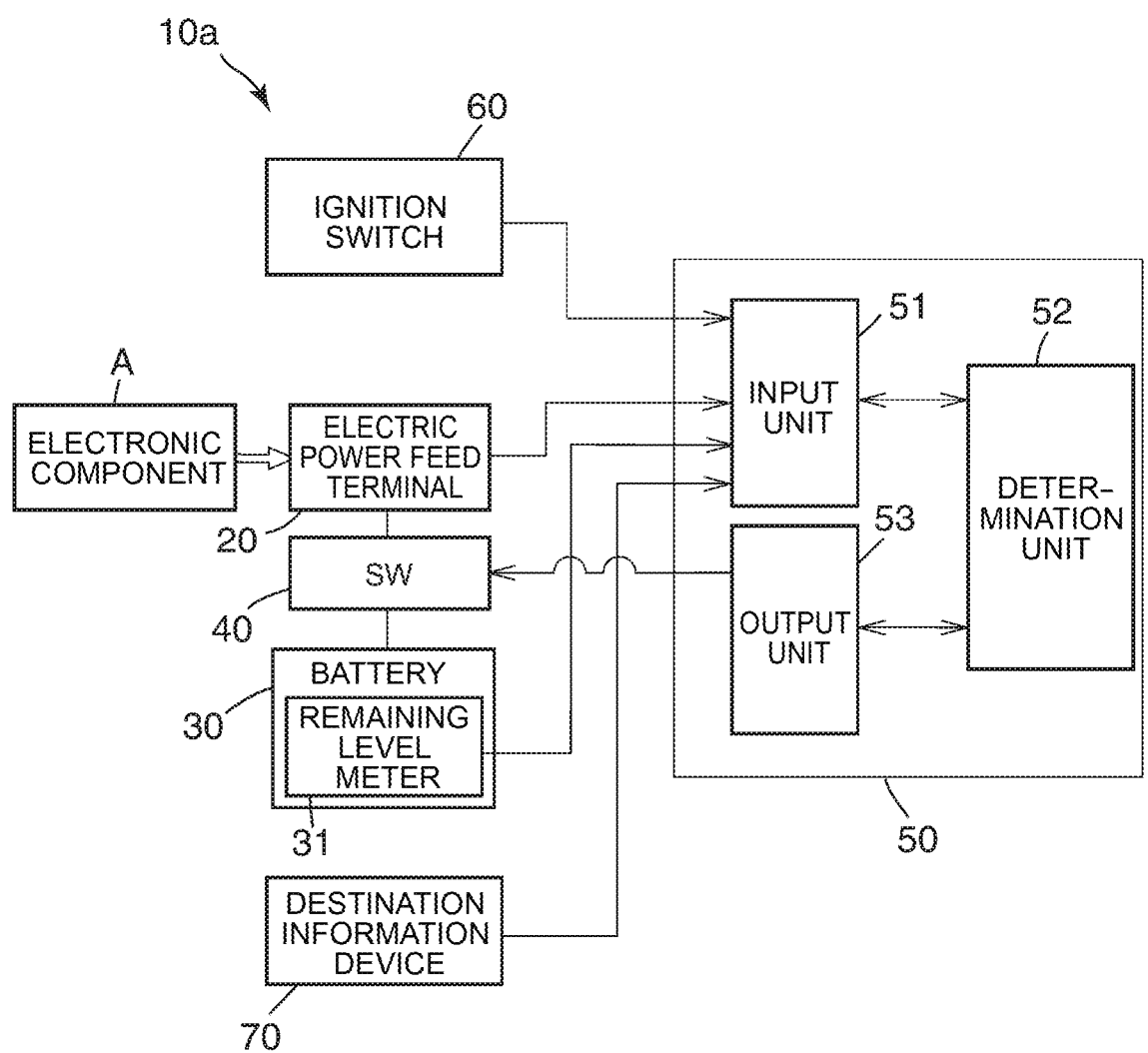
FIG. 1 is a block diagram showing the configuration of an electric power supply system according to the first embodiment of the disclosure.
Figure 2:
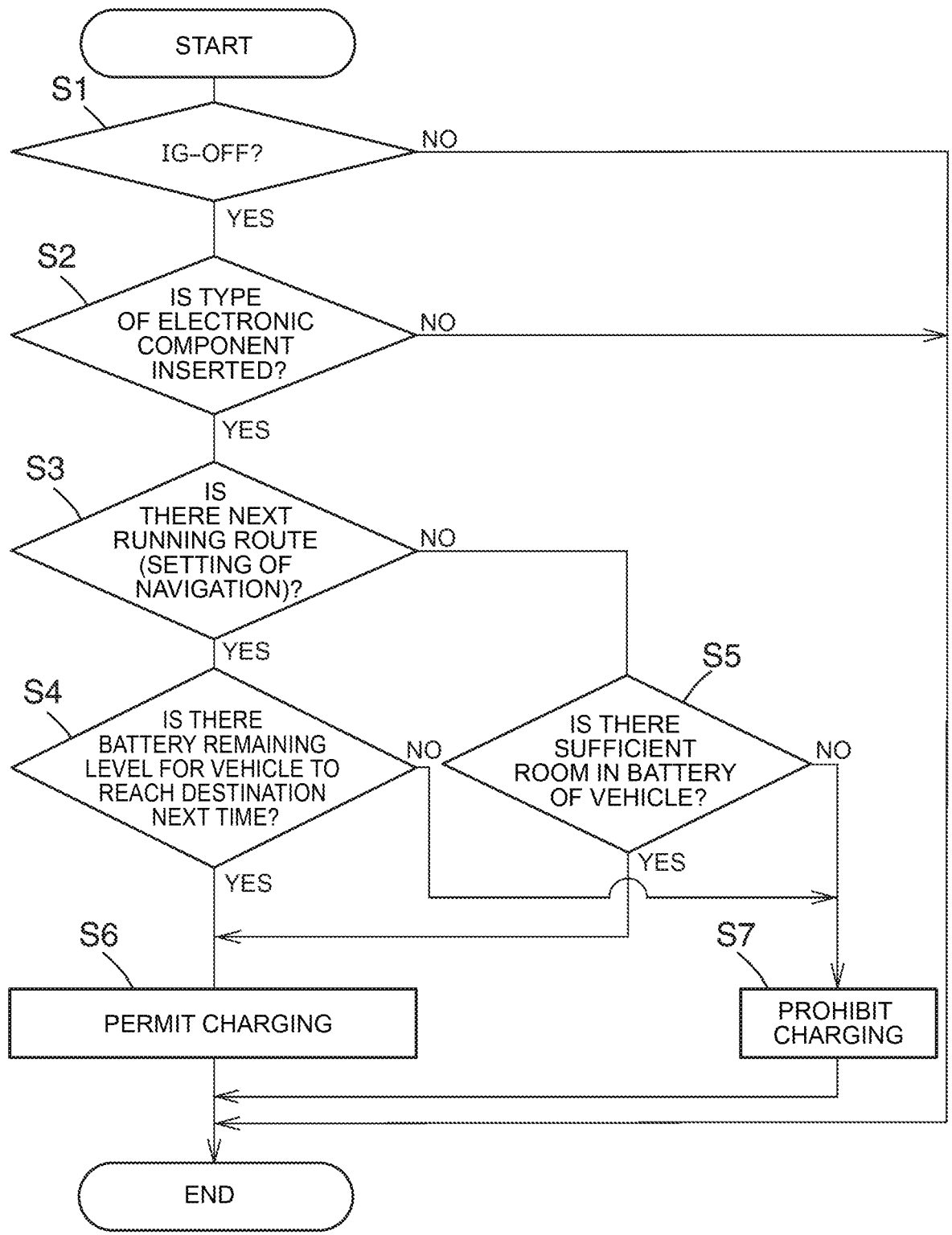
FIG. 2 is a flowchart showing a control routine of a control device in the electric power supply system according to the first embodiment of the disclosure.
Figure 3:
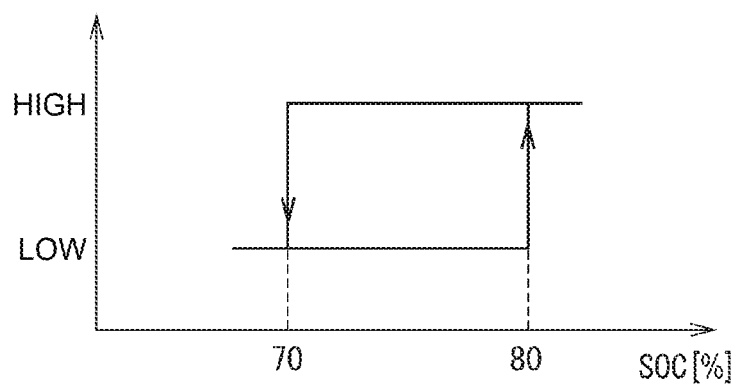
FIG. 3 is a view showing the operation hysteresis of the electric power supply system according to the first embodiment of the disclosure.
Figure 4:
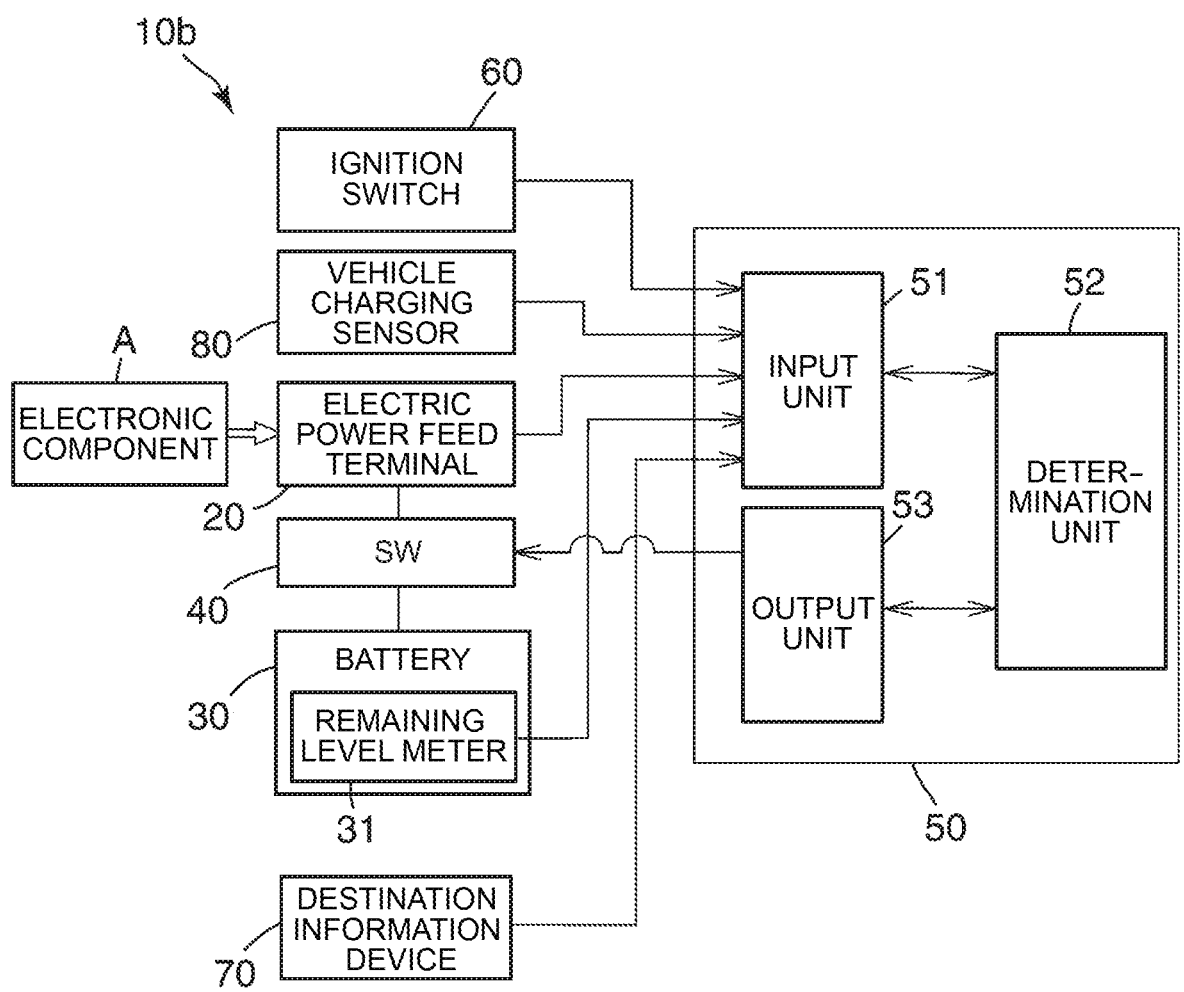
FIG. 4 is a block diagram showing the configuration of an electric power supply system according to the second embodiment of the disclosure.
Figure 5:
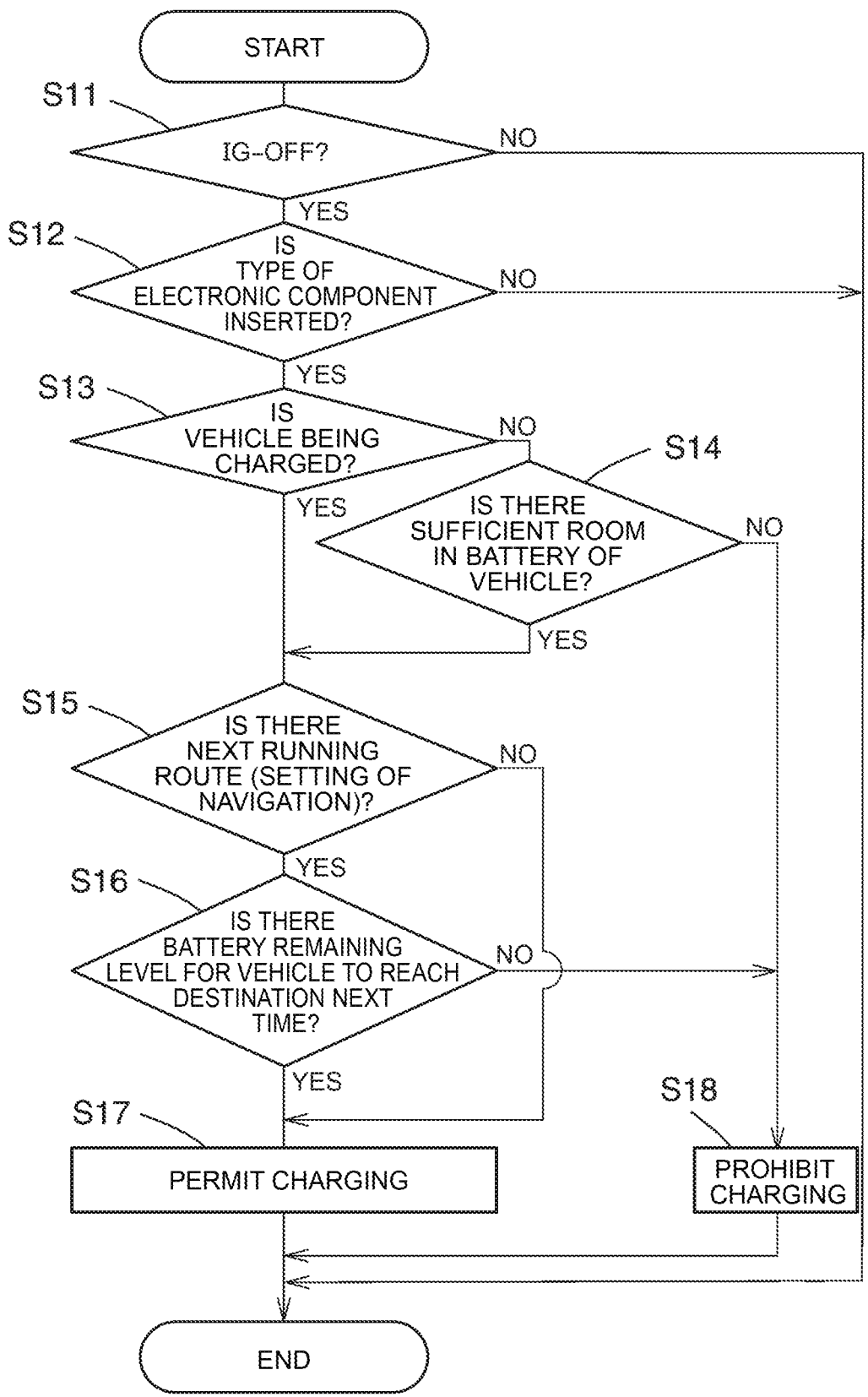
FIG. 5 is a flowchart showing a control routine of a control device in the electric power supply system according to the second embodiment of the disclosure.

Electric power supply systems (devices) for a vehicle according to the embodiments of the disclosure will be described hereinafter with reference to the drawings. FIGS. 1 to 3 show the electric power supply system according to the first embodiment of the disclosure, and FIGS. 4 and 5 show the electric power supply system according to the second embodiment of the disclosure. It should be noted, however, that FIG. 3 is also applicable to the second embodiment of the disclosure. Components that are identical or similar in all the embodiments of the disclosure are denoted by the same reference symbols respectively, in all the embodiments of the disclosure.

First of all, the first embodiment of the disclosure will be described. As shown in FIG. 1, an electric power supply system 10a according to the first embodiment of the disclosure is a device that allows an electronic component (which may also be referred to as a type of electronic component) A brought into a cabin, such as a personal computer or a smartphone, to be charged after being connected to an electric power feed terminal (a USB terminal, a cigar socket, or the like) provided in the cabin, especially when an ignition is off, namely, when an engine is off (Ready-OFF) while a vehicle is parked. That is, the electric power supply system 10a is a device capable of supplying electric power to the electronic component A that is connected to the electric power feed terminal in the cabin when the ignition is off. Incidentally, when the ignition is off, an accessory electric power supply is also off.

The electric power supply system 10a may be provided in a gasoline vehicle or a hybrid vehicle (including a plug-in hybrid vehicle), but is desired to be provided in an electric vehicle. This is because of the following reason. The gasoline vehicle or the hybrid vehicle has a relatively low battery capacity, and when electric power is supplied to the electronic component A with the ignition off, the battery remaining level may become insufficient. However, the electric vehicle has a much higher battery capacity than the gasoline vehicle or the hybrid vehicle, and even when electric power is supplied to the electronic component A with the ignition off, the battery remaining level can be relatively easily ensured.

As shown in FIG. 1, the electric power supply system 10a has an electric power feed terminal 20 to which the electronic component A is connected, a battery 30 as an electric power supply source, a switch 40 that is provided between the electric power feed terminal 20 and the battery 30, and a control device 50 that controls the distribution of electric power from the battery 30 to the electric power feed terminal 20. The electric power supply system 10a further has an ignition switch 60 and a destination information device 70.

The electric power feed terminal 20 is provided in a cabin. The electronic component A brought into the cabin is connected to (inserted into) the electric power feed terminal 20. The electric power feed terminal 20 is not limited in particular, but is provided on, for example, a front console tray, a front center console box, or an instrument panel as an interior member of the vehicle. A signal (information) from the electric power feed terminal 20 is input to the control device 50.

The battery 30 is a vehicular battery that is mounted in the vehicle. The battery 30 has a battery remaining level meter 31 that measures a battery remaining level. A signal (information) from the battery remaining level meter 31 is input to the control device 50.

The switch 40 is provided between the electric power feed terminal 20 and the battery 30. A changeover is made between an on state of the distribution of electric power from the battery 30 to the electric power feed terminal 20 and an off state of the distribution of electric power from the battery 30 to the electric power feed terminal 20, based on an output signal from the control device 50.

The ignition switch 60 can detect whether or not the ignition is off, namely, whether or not an engine is off (Ready-OFF). A signal (information) from the ignition switch 60 is input to the control device 50.

The destination information device 70 is a device that predicts a scheduled running distance to a destination when the vehicle runs next time. The scheduled running distance to the destination may be determined through (i) the setting of navigation by a user (an occupant in the cabin), or may be determined through (ii) prediction by a cloud. More specifically, the scheduled running distance to the destination may be determined based on (i) information on the destination and route set by the user through the use of a device such as a navigation device mounted in the vehicle or a device that has a navigation function and that is brought into the cabin, or may be determined based on (ii) information on the destination and route predicted by the cloud based on information obtained so far in accordance with living conditions of the user, such as commute at certain hours on weekdays. In the aforementioned case (i), the destination information device 70 has the navigation device mounted in the vehicle and/or the device that has the navigation function and that is brought into the cabin. In the aforementioned case (ii), the destination information device 70 has a cloud information reception device that is mounted in the vehicle and that receives information from the cloud (a cloud server). A signal (information) from the destination information device 70 is input to the control device 50.

The control device 50 has an input unit 51, a determination unit (a computation unit) 52, and an output unit 53. A signal from the electric power feed terminal 20, a signal from the battery 30, a signal from the ignition switch 60, and a signal from the destination information device 70 are input to the input unit 51. The determination unit 52 has a ROM and a RAM, and determines, based on the signals input to the input unit 51, whether or not the electronic component A is connected to the electric power feed terminal 20, whether or not the battery remaining level is higher than 0, whether or not the ignition is off, and whether or not there is a piece of information on a scheduled running distance to a destination when the vehicle runs next time. The output unit 53 outputs, to the switch 40, signals based on results of the determinations made by the determination unit 52. Thus, a changeover is made between an on-state and an off-state of the switch 40. The foregoing configuration of the first embodiment of the disclosure is also applicable to the second embodiment of the disclosure.

FIG. 2 is a flowchart showing a control routine of the control device 50 in the electric power supply system 10a according to the first embodiment of the disclosure. The control routine shown in FIG. 2 is carried out at intervals of a predetermined time.

First of all, in step S1, the determination unit 52 determines, based on a signal from the ignition switch 60, whether or not the ignition is off. If it is determined in step S1 that the ignition is not off (that the ignition is on), a transition to an end step is made without outputting a signal from the output unit 53 to the switch 40. On the other hand, if it is determined in step S1 that the ignition is off, a transition to step S2 is made, and the determination unit 52 determines, based on a signal from the electric power feed terminal 20, whether or not the electronic component A is connected to the electric power feed terminal 20.

If it is determined in step S2 that the electronic component A is not connected to the electric power feed terminal 20, a transition to the end step is made without outputting a signal from the output unit 53 to the switch 40. On the other hand, if it is determined in step S2 that the electronic component A is connected to the electric power feed terminal 20, a transition to step S3 is made, and the determination unit 52 determines, based on a signal from the destination information device 70, whether or not there is a piece of information on a scheduled running distance to a destination when the vehicle runs next time.

If it is determined in step S3 that there is no piece of information on the scheduled running distance, a transition to step S5 is made, and the determination unit 52 determines, based on a signal from the battery 30, whether or not there is sufficient room in the battery remaining level. As shown in, for example, FIG. 3, it is determined that there is sufficient room in this battery remaining level when the battery remaining level (state of charge (SOC)) is equal to or higher than 80% of full charge, and it is determined that there is no sufficient room in this battery remaining level when the battery remaining level decreases to or below 70% through the supply of electric power to the electronic component A. Two thresholds are set in this manner for the purpose of preventing the phenomenon of hunting when a changeover is made. Incidentally, although FIG. 3 shows the case where the two thresholds are 80% and 70% respectively, the two thresholds should not be limited in particular.

Then, if it is determined in step S5 that there is sufficient room in the battery remaining level, a transition to step S6 shown in FIG. 2 is made, a signal for distributing electric power from the battery 30 to the electric power feed terminal 20 (a signal for permitting the charging of the electronic component A) is output from the output unit 53 to the switch 40, and a transition to the end step is made. If it is determined in step S5 that there is no sufficient room in the battery remaining level, a transition to step S7 is made, a signal for shutting off the distribution of electric power from the battery 30 to the electric power feed terminal 20 (a signal for prohibiting the charging of the electronic component A) is output from the output unit 53 to the switch 40, and a transition to the end step is made.

On the other hand, if it is determined in step S3 that there is a piece of information on the scheduled running distance, a transition to step S4 is made, and the determination unit 52 determines, based on the information on the distance and a signal from the battery 30, whether or not there is a battery remaining level that is needed for the vehicle to reach the destination when the vehicle runs next time. If it is determined in step S4 that there is a battery remaining level, a transition to step S6 is made, a signal for distributing electric power from the battery 30 to the electric power feed terminal 20 (a signal for permitting the charging of the electronic component A) is output from the output unit 53 to the switch 40, and a transition to the end step is made. On the other hand, if it is determined in step S4 that there is no battery remaining level, a transition to step S7 is made, a signal for shutting off the distribution of electric power from the battery 30 to the electric power feed terminal 20 (a signal for prohibiting the charging of the electronic component A) is output from the output unit 53 to the switch 40, and a transition to the end step is made.

The following effects can be obtained in the foregoing first embodiment of the disclosure.

The control device 50 distributes electric power from the battery 30 to the electric power feed terminal 20 only when the remaining level of the battery 30 is equal to or higher than a predetermined value (when there is a battery remaining level that is needed for the vehicle to reach the destination in the case where there is a piece of information on the scheduled running distance, and when there is a relatively sufficient battery remaining level, for example, a battery remaining level equal to or higher than 80% in the case where there is no piece of information on the scheduled running distance), with the ignition off. Therefore, when the remaining level of the battery 30 is equal to or higher than the predetermined value, the electronic component A can be charged after being connected to the electric power feed terminal 20 even with the ignition off. On the other hand, when the remaining level of the battery 30 is lower than the predetermined value, the distribution of electric power from the battery 30 to the electric power feed terminal 20 is shut off, and the electronic component A can be stopped from being charged even after being connected to the electric power feed terminal 20. Therefore, even in the case where the electronic component A can be charged after being connected to the electric power feed terminal 20 with the ignition off, a battery remaining level that is needed when the vehicle runs next time can be ensured.

When there is a piece of information on the scheduled running distance, the predetermined value is determined based on a next scheduled running distance. Therefore, a battery remaining level that is needed for the vehicle to reach the destination when the vehicle runs next time can be reliably ensured.

When the next scheduled running distance is determined through prediction by the cloud, it is possible to determine the next scheduled running distance based on information on the destination and route predicted by the cloud, without requiring the user to set the destination and the running route.

When the next scheduled running distance is determined through the setting of navigation by the user, it is possible to determine the next scheduled running distance based on the information on the destination and route set by the user.

When the remaining level of the battery 30 is equal to or higher than the predetermined value even with the ignition off, the electronic component A can be charged by distributing electric power from the battery 30 to the electric power feed terminal 20. Therefore, effects can be obtained in the following cases. (i) In traveling from a place P1 toward a place P2, the vehicle leaves after the destination information device 70 sets a destination (the place P2). In this case, the amount of charge of the electronic component A such as the personal computer brought into the cabin is small. Therefore, the vehicle runs with the electronic component A connected to the electric power feed terminal (a vehicle outlet) 20 of the vehicle. (ii) The vehicle is stopped at a parking lot at a position P3 on the way to the place P2 for the purpose of resting, shopping, and the like, and the ignition is turned off (the engine is turned off (Ready-OFF)). At this time, if the distribution of electric power to the electric power feed terminal 20 is stopped as soon as the ignition is turned off, the electronic component A is not charged. In the embodiment of the disclosure, however, when the battery remaining level is equal to or higher than the predetermined value, the electronic component A continues to be charged even with the ignition off. (iii) The charging of the electronic component A is permitted with the ignition off, in consideration of the battery remaining level. Therefore, the vehicle can be started by turning the ignition on (turning the engine on (Ready-ON)) again, and can travel to the place P2. Then, when the vehicle reaches the place P2, the electronic component A has been charged with the ignition off as well as with the ignition on. Therefore, the amount of charge of the electronic component A is larger than in the case where the electronic component A has not been charged with the ignition off but has been charged only with the ignition on. The effects of the foregoing first embodiment of the disclosure are also applicable to the second embodiment of the disclosure.

Next, the second embodiment of the disclosure will be described. As is the case with the electric power supply system 10a according to the first embodiment of the disclosure, an electric power supply system 10b according to the second embodiment of the disclosure has the electric power feed terminal 20 to which the electronic component A is connected, the battery 30, the switch 40, the control device 50, the ignition switch 60, and the destination information device 70 as shown in FIG. 4. The electric power supply system 10b according to the second embodiment of the disclosure further has a vehicle charging sensor 80. The electric power supply system 10b has the vehicle charging sensor 80 because of the following reason. When a vehicle main body is being charged even with the ignition off, the battery remaining level increases, so the charging of the electronic component A by distributing electric power from the battery 30 to the electric power feed terminal 20 is influenced.

The vehicle charging sensor 80 can detect whether or not the vehicle main body is being charged. A signal (information) from the vehicle charging sensor 80 is input to the control device 50.

In addition to a signal from the electric power feed terminal 20, a signal from the battery 30, a signal from the ignition switch 60, and a signal from the destination information device 70, a signal from the vehicle charging sensor 80 is input to the input unit 51 of the control device 50. The determination unit 52 of the control device 50 determines, based on the signals input to the input unit 51, whether or not the electronic component A is connected to the electric power feed terminal 20, whether or not the battery remaining level is higher than 0, whether or not the ignition is off, whether or not there is a piece of information on the scheduled running distance to the destination when the vehicle runs next time, and whether or not the vehicle is being charged.

FIG. 5 is a flowchart showing a control routine of the control device 50 in the electric power supply system 10b according to the second embodiment of the disclosure. The control routine shown in FIG. 5 is carried out at intervals of a predetermined time.

First of all, in step S11, the determination unit 52 determines, based on a signal from the ignition switch 60, whether or not the ignition is off. If it is determined in step S11 that the ignition is not off (that the ignition is on), a transition to an end step is made without outputting a signal from the output unit 53 to the switch 40. On the other hand, if it is determined in step S11 that the ignition is off, a transition to step S12 is made, and the determination unit 52 determines, based on a signal from the electric power feed terminal 20, whether or not the electronic component A is connected to the electric power feed terminal 20.

If it is determined in step S12 that the electronic component A is not connected to the electric power feed terminal 20, a transition to the end step is made without outputting a signal from the output unit 53 to the switch 40. On the other hand, if it is determined in step S12 that the electronic component A is connected to the electric power feed terminal 20, a transition to step S13 is made, and the determination unit 52 determines, based on a signal from the vehicle charging sensor 80, whether or not the vehicle main body is being charged.

If it is determined in step S13 that the vehicle main body is not being charged, a transition to step S14 is made, and the determination unit 52 determines, based on a signal from the battery 30, whether or not there is sufficient room in the battery remaining level. As shown in FIG. 3, it is determined that there is sufficient room in this battery remaining level when the battery remaining level is equal to or higher than 80% of full charge, and it is determined that there is no sufficient room in this battery remaining level when the battery remaining level (state of charge (SOC)) decreases to or below 70% through the supply of electric power to the electronic component A. Two thresholds are set in this manner for the purpose of preventing the phenomenon of hunting when a changeover is made. Incidentally, although FIG. 3 shows the case where the two thresholds are 80% and 70% respectively, the two thresholds should not be limited in particular.

Then, if it is determined in step S14 that there is sufficient room in the battery remaining level, a transition to step S15 shown in FIG. 5 is made, and the determination unit 52 determines, based on a signal from the destination information device 70, whether or not there is a piece of information on a scheduled running distance to a destination when the vehicle runs next time. On the other hand, if it is determined in step S14 that there is no sufficient room in the battery remaining level, a transition to step S18 is made, a signal for shutting off the distribution of electric power from the battery 30 to the electric power feed terminal 20 (a signal for prohibiting the charging of the electronic component A) is output from the output unit 53 to the switch 40, and a transition to the end step is made.

On the other hand, if it is determined in step S13 that the vehicle main body is being charged, a transition to step S15 is made, and the determination unit 52 determines, based on the signal from the destination information device 70, whether or not there is a piece of information on the scheduled running distance to the destination when the vehicle runs next time.

If it is determined in step S15 that there is no piece of information on the scheduled running distance, a transition to step S17 is made, a signal for distributing electric power from the battery 30 to the electric power feed terminal 20 (a signal for permitting the charging of the electronic component A) is output from the output unit 53 to the switch 40, and a transition to the end step is made.

On the other hand, if it is determined in step S15 that there is a piece of information on the scheduled running distance, a transition to step S16 is made, and the determination unit 52 determines, based on the piece of information on the distance and a signal from the battery 30, whether or not there is a battery remaining level that is needed for the vehicle to reach the destination when the vehicle runs next time. If it is determined in step S16 that there is a battery remaining level, a transition to step S17 is made, a signal for distributing electric power from the battery 30 to the electric power feed terminal 20 (a signal for permitting the charging of the electronic component A) is output from the output unit 53 to the switch 40, and a transition to the end step is made. On the other hand, if it is determined in step S16 that there is no battery remaining level, a transition to step S18 is made, a signal for shutting off the distribution of electric power from the battery 30 to the electric power feed terminal 20 (a signal for prohibiting the charging of the electronic component A) is output from the output unit 53 to the switch 40, and a transition to the end step is made.

The following effects can be obtained in the foregoing second embodiment of the disclosure, in addition to the effects obtained in the first embodiment of the disclosure. The control device 50 also determines whether or not the vehicle main body is being charged. Therefore, the on/off state of the distribution of electric power from the battery 30 to the electric power feed terminal 20 can be controlled also in consideration of whether or not the vehicle main body is being charged.

What is claimed is:

1. An electric power supply system for a vehicle for supplying electric power to an electronic component that is connected to an electric power feed terminal in a cabin, the electric power supply system comprising:
    an electric power feed terminal;
    a battery as an electric power supply source;
    a control device that controls distribution of electric power from the battery to the electric power feed terminal, wherein
    the control device distributes electric power from the battery to the electric power feed terminal, when a remaining level of the battery is equal to or higher than a predetermined value with an ignition off.

2. The electric power supply system for the vehicle according to claim 1, wherein the predetermined value is determined based on a next scheduled running distance.

3. The electric power supply system for the vehicle according to claim 2, wherein the next scheduled running distance is determined through prediction by a cloud.

4. The electric power supply system for the vehicle according to claim 2, wherein the next scheduled running distance is determined through setting of navigation by a user.

5. An electric power supply system for a vehicle for supplying electric power to an electronic component that is connected to an electric power feed terminal in a cabin, the electric power supply system comprising:
    an electric power feed terminal;
    a battery as an electric power supply source;
    a switch provided between the electric power feed terminal and the battery;
    a control device that controls distribution of electric power from the battery to the electric power feed terminal, wherein
    the control device distributes electric power from the battery to the electric power feed terminal, when a remaining level of the battery is equal to or higher than a predetermined value with an ignition off.

6. The electric power supply system for the vehicle according to claim 5, wherein the predetermined value is determined based on a next scheduled running distance.

7. The electric power supply system for the vehicle according to claim 6, wherein the next scheduled running distance is determined through prediction by a cloud.

8. The electric power supply system for the vehicle according to claim 6, wherein the next scheduled running distance is determined through setting of navigation by a user.

9. An electric power supply system for a vehicle for supplying electric power to an electronic component that is connected to an electric power feed terminal in a cabin, the electric power supply system comprising:
    an electric power feed terminal configured to supply an electric power to an electronic component connected to the electric power feed terminal;
    a battery as an electric power supply source;
    a control device that controls distribution of electric power from the battery to the electric power feed terminal, wherein
    the control device distributes electric power from the battery to the electric power feed terminal, when a remaining level of the battery is equal to or higher than a predetermined value with an ignition off.

10. The electric power supply system for the vehicle according to claim 9, wherein the predetermined value is determined based on a next scheduled running distance.

11. The electric power supply system for the vehicle according to claim 10, wherein the next scheduled running distance is determined through prediction by a cloud.

12. The electric power supply system for the vehicle according to claim 10, wherein the next scheduled running distance is determined through setting of navigation by a user.

* * * * *